United States Patent [19]

Ferneau et al.

[11] 3,752,527

[45] Aug. 14, 1973

[54] MULTI-LEVER ONE MAN CART ADAPTED TO BE MOVED UP AND DOWN STAIRS

[75] Inventors: Richard H. Ferneau, Columbus; Elroy E. Bourgraf, Greenfield, both of Ohio

[73] Assignee: Burt Weil, Cincinnati, Ohio

[22] Filed: Nov. 18, 1971

[21] Appl. No.: 200,138

[52] U.S. Cl.................... 296/20, 280/5.32, 108/120
[51] Int. Cl........................... A61g 1/02, B62b 3/02
[58] Field of Search .................... 296/20; 5/86, 149, 5/62, 63; 280/5.2, 5.32, 36, 47.2; 108/120, 121

[56] References Cited
UNITED STATES PATENTS
3,082,016  3/1963  Pratt..................................... 296/20
1,063,442  6/1913  Harter.................................. 108/121

Primary Examiner—Philip Goodman
Assistant Examiner—John A. Carroll
Attorney—James S. Hight, David S. Stallard et al.

[57] ABSTRACT

A cart for transporting articles of merchandise or human bodies comprising a bed supported on four legs having an X-frame configuration, the legs being capable of being angulated with respect to each other to change the level of the bed, one pair of legs being formed in two sections, the lowermost section being pivotable with respect to the upper section to permit it to swing into substantial alignment with the fixed legs to enable an operator to thrust the cart into a vehicle while standing at one end of the cart and to enable the operator to move the cart up and down steps while standing at the other end of the cart.

15 Claims, 18 Drawing Figures

INVENTORS
Richard H. Ferneau
Elroy E. Bourgraf
BY Wood, Herron & Evans
ATTORNEYS

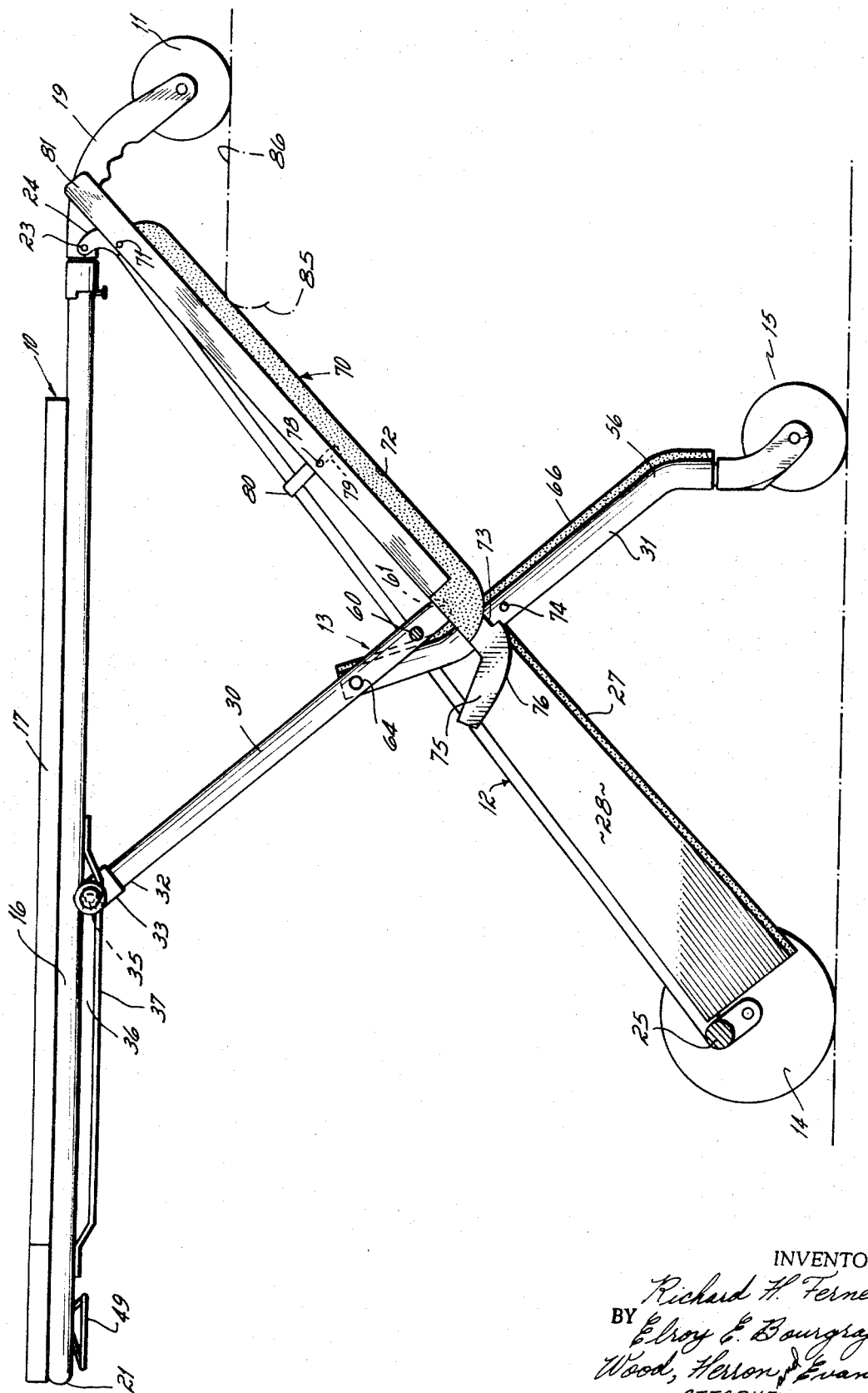

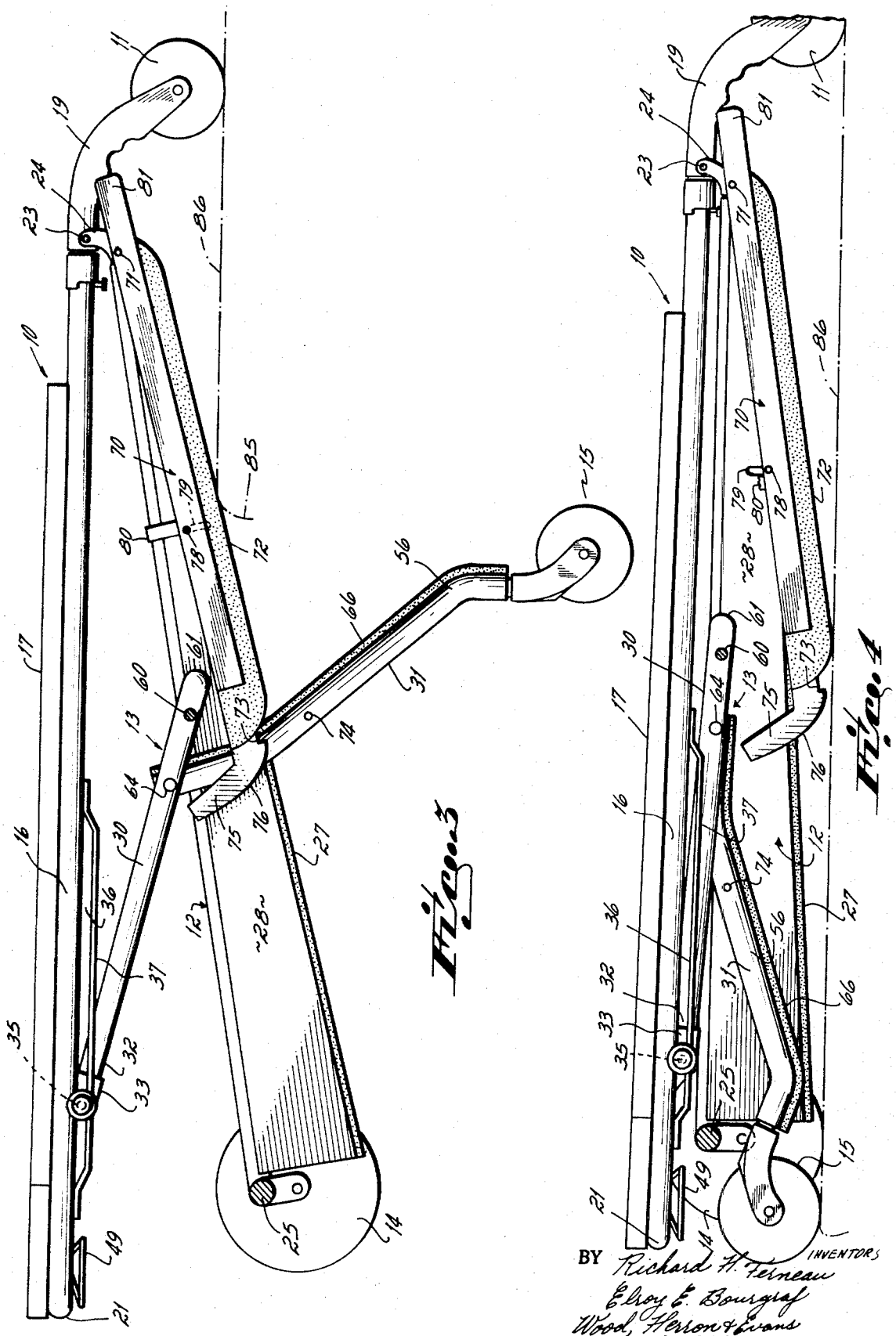

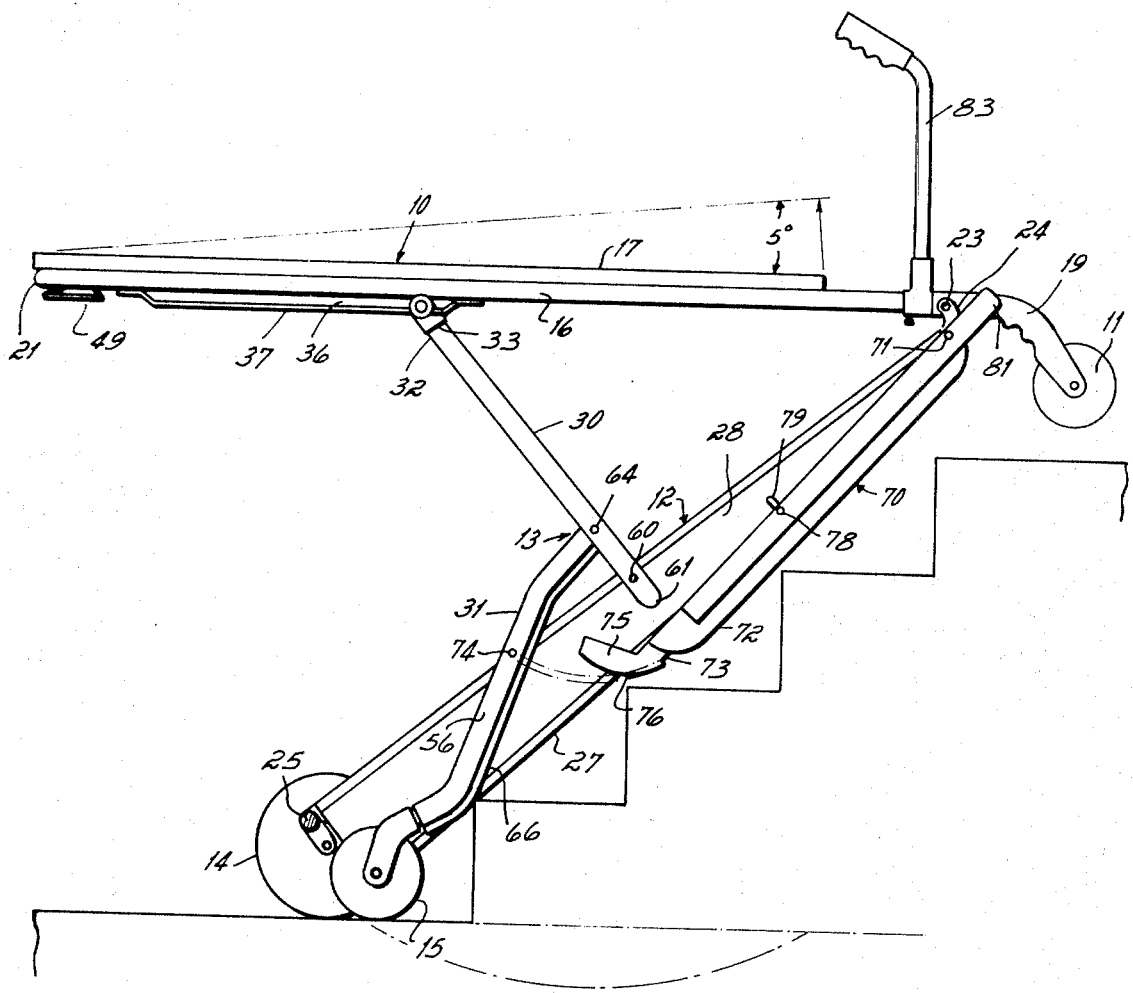

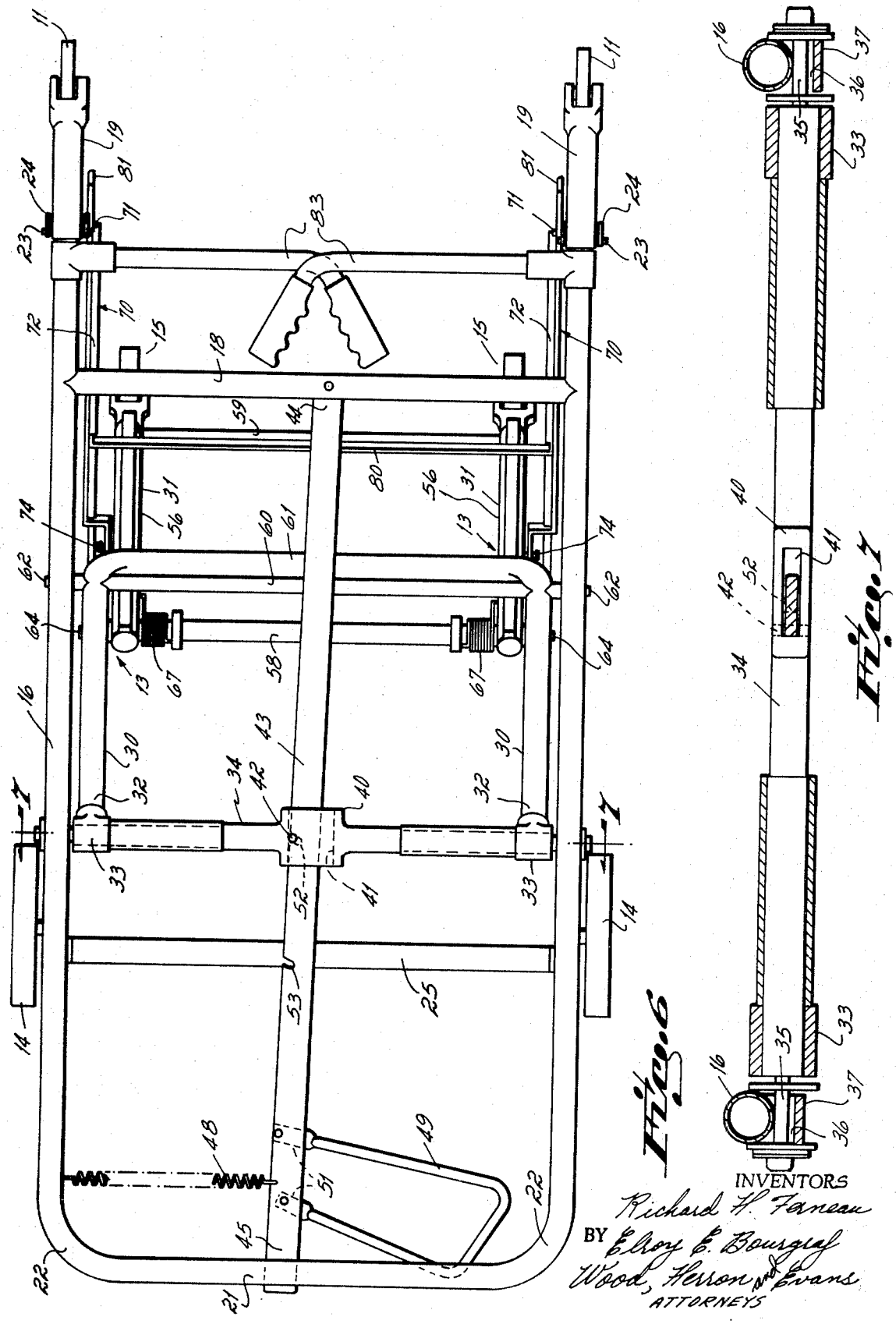

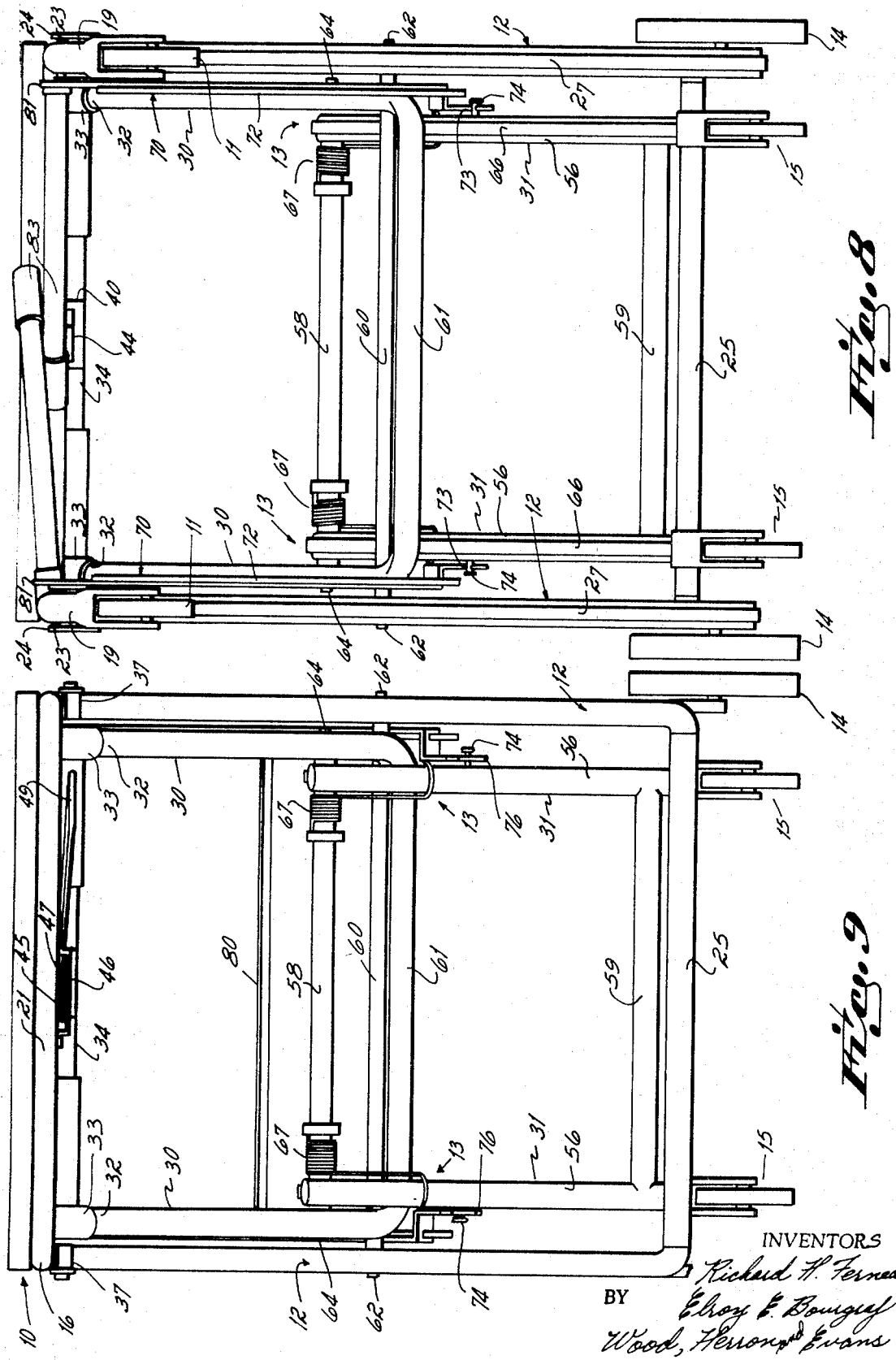

INVENTORS
Richard H. Ferneau
BY Elroy E. Bourgraf
Wood, Herron and Evans
ATTORNEYS

MULTI-LEVER ONE MAN CART ADAPTED TO BE MOVED UP AND DOWN STAIRS

This invention relates to a cart for transporting articles or bodies. More particularly, the invention is directed to a cart adapted for one-man loading into and out of the vehicle, the bed of the cart having at least two levels and the cart being convertible from a four-legged support to a two-legged support for negotiating stairs, curbs and the like.

By way of background, the cart of the present invention is an improvement in the cart disclosed in U.S. Pat. No. 3,493,262. That patent discloses a cart having a bed supported on four vertical legs, a pair of auxiliary wheels on the forward end of the cart and handles on the rear end of the cart. The legs are normally maintained in their vertical attitude by releasable braces and means are provided for releasing the braces by an operator standing at the rear of the cart. This combination enables an operator to support a heavy object on the bed of the cart and move the cart into and out of a vehicle by supporting the cart through the engagement of the auxiliary wheels with the vehicle bed as the cart is thrust into or pulled out of the vehicle. When out of the vehicle, the cart is supported by the vertical legs, the rear legs having caster wheels and the forward legs having ordinary wheels.

An objective of the invention has been to improve the cart described above in two major respects, namely, to greatly improve the capability of the cart being moved up and down stairs by a single operator and to provide means for positioning the bed of the cart at more than one level above ground. The "multi-level" feature is important, for the cart must be at one level to enable the auxiliary wheels to engage the floor of the vehicle during the loading of the cart into the vehicle and at another level for other operations. In the case of a salesman's cart for demonstrating merchandise, it is highly advantageous to lower the level of the cart and the merchandise mounted thereon for the purpose of demonstrating to a customer, particularly where the parts of merchandise to be manipulated are located on the upper surface of the merchandise. In the case of handling bodies or patients, the body may have to be moved from a low-level bed onto the cart, the cart thrust into an ambulance at a higher level and the body shifted from the cart onto even a higher level hospital bed. The capability of negotiating steps and curbs, particularly without measurably altering the horizontal attitude of the bed of the cart is obviously highly desirable, for that capability greatly increases the convenience with which the cart can be moved by a single operator to more or less inaccessible places.

It will be observed, too, from the following description that the invention provides for the negotiation of stairs by an operator maintaining his body at that attitude which imposes the least strain upon it.

The objective of the invention as described above has been achieved through several important structural improvements in the cart of the type described in U.S. Pat. No. 3,493,262.

A first improvement resides in the change from vertical legs to X-configurated legs, the upper ends of at least one pair of the legs being slidable with respect to the bed of the cart so that when slid to one position, the legs raise the level of the bed and when slid to another position, the legs lower the level of the bed.

Another improvement resides in the forming of one pair of legs into two sections, so that the lowermost section, which underlies the auxiliary wheels is pivotable rearwardly to lie in substantially the same plane as the one-piece legs. The rearward swinging of the lower leg sections swings them out of the way so as to permit an unimpeded thrust of the cart onto the floor of the vehicle, as well as permitting a two-wheeled operation for negotiating stairs.

In the patented cart, the casters have been located at the rear of the cart, that is, at the end of the cart remote from the auxiliary wheels and the entire operation of the cart was performed from the rear of the cart. It has been another feature of the invention to reverse the positioning of the caster wheels so that they underlie the auxiliary wheels and to provide for manipulation of the cart from either end. For the sake of convenience of description, the end of the cart having the auxiliary wheels will be designated the forward end of the cart and the opposite end being the rearward end of the cart. The operator stands at the rear end of the cart during the loading and unloading operations and altering the level of the cart. The operator stands at the forward end of the cart during its movement from place to place, including negotiating curbs and stairs.

Another feature of the present invention resides in the provision of a latch which normally locks the pivotable lower leg sections in their supportive position, the latch being releasable by an operator standing at the forward end of the cart when it is necessary to negotiate curbs or stairs and is releasable by the engagement of the latch at the rear extremity of a vehicle when the operator is standing at the rear of the cart during the loading of the cart into a vehicle.

Another feature of the invention has been to provide a pivotal engagement of the lower leg sections with the upper leg sections which permits the lower leg sections to be swung from their normal positions to a position aligned with the one-piece legs which requires tipping of the angle of the bed of the cart through an angle of approximately only 5°. This feature, along with other features relating to the maintaining of the horizontal attitude of the cart, are important in keeping the merchandise from sliding off the cart and in transporting those articles having fluids which might spill out of containers.

Another feature of the invention has been to provide vertical handle extensions normally pivotable out of the way of the operator, but swingable into a vertical position which enables the operator to maintain cottrol of a cart while on stairways with the operator maintaining his body erect so as to minimize the strain upon it during the negotiation of stairs.

The foregoing as well as other features and objectives of the invention will become more readily apparent from the following detailed description taken in conjunction with the accompanying drawings in which:

FIG. 2 is a side elevational view thereof, partially broken away and showing the leg latch in an unlatched condition;

FIG. 3 is a side elevational view showing the cart in a partially collapsed condition as in loading or unloading from a vehicle;

FIG. 4 shows the cart in a fully collapsed condition;

FIG. 5 shows the cart in the condition for ascending or descending stairs;

FIG. 6 is a top plan view of the cart in its erected condition with the tabletop removed from the bed;

FIG. 7 is a cross-sectional view taken along lines 7—7 of FIG. 6;

FIG. 8 is an end elevational view of the cart taken from the forward end;

FIG. 9 is an end elevational view of the cart taken from the rearward end;

Figure 1:
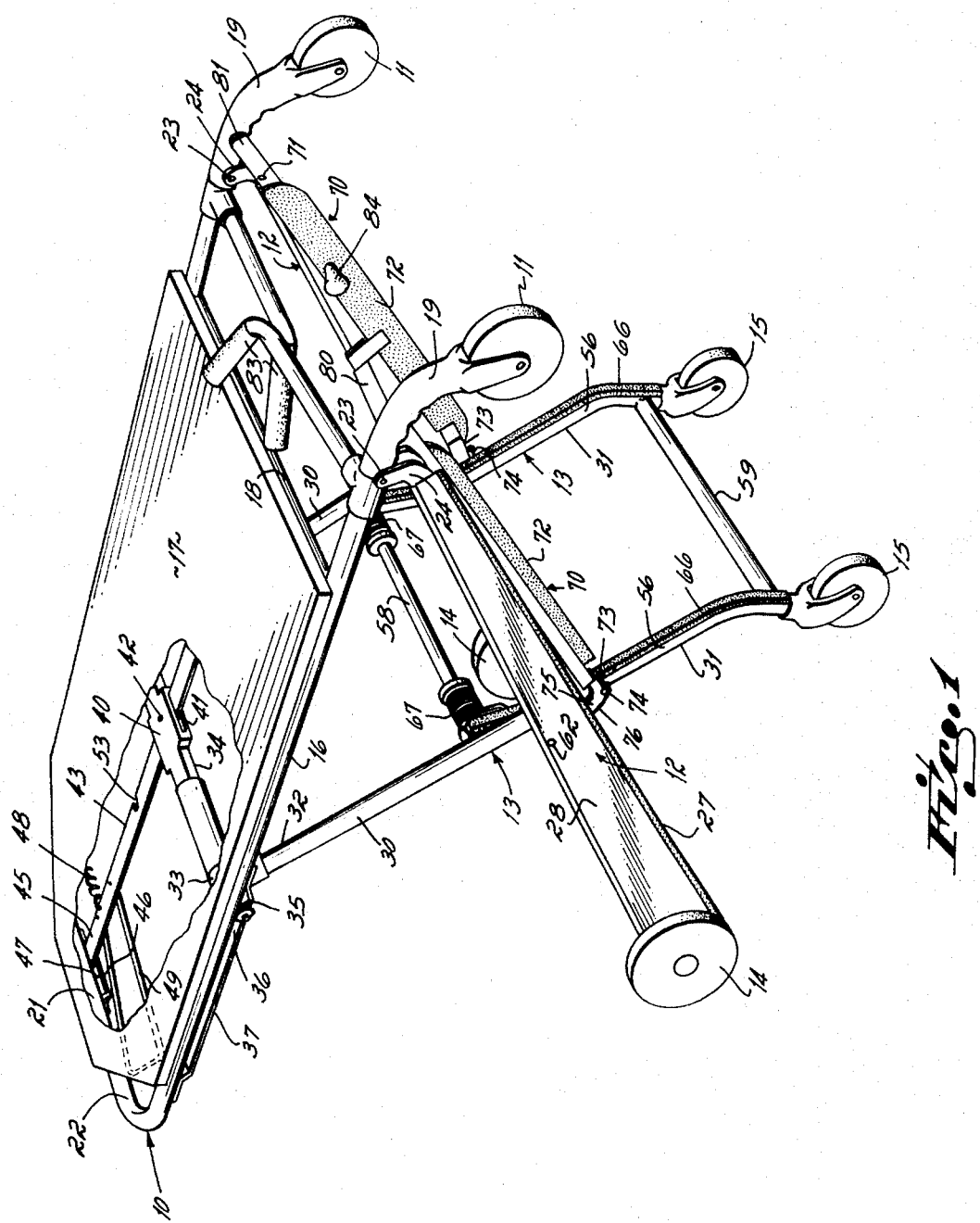
FIG. 1 is a perspective view of the cart of the present invention.
Figure 10A:
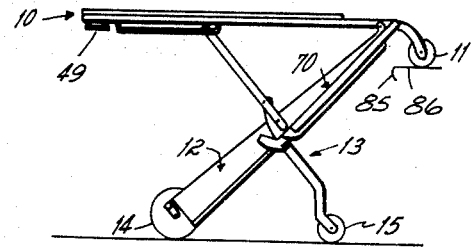
FIGS. 10A to 10E are diagrammatic side elevational views illustrating the loading and unloading operations.

Referring to FIG. 1, the cart comprises a bed 10 having auxiliary wheels 11 at its forward end thereof, rear one-piece legs 12 and forward two-section legs 13. The rearward legs have ordinary wheels 14 at their lower ends and the forward legs have casters 15 at their lower ends.

The bed is formed of a U-shaped tubular frame member 16 onto which is bolted a board tabletop 17. The frame has a crossbar brace 18 near the forward end. The auxiliary wheels 11 are rotatably mounted on downwardly curved extensions 19 of the U-frame 16, the extensions forming hand grips for the operator. At the bight portion 21 of the U-frame the tabletop 17 has its corners removed to expose corners 22 of the U-frame, the corners 22 forming hand grips for the operator standing at the rear of the cart.

The rearward one-piece legs 12 are pivoted at their upper ends 23 to the forward end of the frame adjacent the auxiliary wheels 11 and are adapted to swing upwardly to lie against the bed of the cart when it is in collapsed condition. The connection to the frame is made by a one-piece casting having a yoke portion 24 which receives the frame 16 and is bolted to the frame to form the pivoted connection. The casting has a stub (not shown) which projects into the tubular leg and is pinned to the tubular leg. The lower ends of the legs 12 are interconnected by a crossbar 25.

The one-piece legs have nylon skids 27 secured to them by means of an elongated, generally triangular skid mounting bracket 28 which provides a surface along which the legs and cart can slide as it is thrust into a vehicle. The nylon skid extends approximately tangentially to the rim of fixed wheel 14 so that the cart can be moved up and down steps and smoothly thrust into the vehicle without hanging up on the wheels.

The forward legs are formed by an upper section 30 and a lower section 31. The upper section is U-shaped, with its ends 32 being pivoted by means of a T-fitting 33 to a crosspiece 34 which is slidably mounted at the top of the cart.

The crosspiece 34 has a pin 35 at each end which projects into a slot 36 formed between the bed frame member 16 and a metal strap 37 bolted at its ends to the frame member, the pins 35 being slidable in the slot as the level of the cart is changed between its uppermost position, through lower levels to the collapsed position.

The crosspiece 34 has at its central portion a latching sleeve 40 having a longitudinally extending slot 41 through which a latching pin 42 projects, the latching pin extending vertically through the casting. The latching pin is engageable by a level-locating bar 43. The level-locating bar 43 is pivoted at its forward end 44 to the frame crossbar 18 and is slidably supported at its rearward end 45 to the U-shaped frame member 16 by means of a metal strap 46 riveted at its ends to the frame member, the strap forming a slot 47 between the strap and bight portion 21 of the frame 16.

A tension spring 48 is connected between the U-frame 16 and the bar 43 to urge the bar 43 in the latching direction. At the other side of the level-locating bar 43 is a U-shaped actuator 49 bolted at its ends 51 to the bar and underlying the frame member at approximately the location of the operator's hand when the frame is gripped at corners 22.

The level-locating bar 43 has at least two notches 52, 53 which are engageable by the latching pin 42. The notch 52 closest to the center portion of the cart sets the cart in its uppermost level and all notches 53, etc., toward the rearward end of the cart provide positioning of the crosspiece 34 to set the cart in lower levels.

The level-locating bar is employed in two operations of the cart, namely, loading into a vehicle and changing the level. In both, the bar is simply swung counter-clockwise (as viewed from above) by pulling on actuator 49 against spring 48. Thus, the notch is swung away from the latching pin 42, permitting the crosspiece 34 to slide and with it the upper ends of legs 13, whereby the level of the bed is changed or the cart is collapsed and thrust into a vehicle.

The lower leg section 31 has leg members 56 which are interconnected by an upper crosstube 58 and a lower crosstube 59. The upper leg section 30 is pivoted to the one-piece rearward legs 12 at the lower end of leg section 30 on a first axis by means of a crossbar 60 projecting through the lower portion 61 of the upper leg section, the crossbar being bolted to the one-piece legs as at 62.

The lower leg section is pivoted on a second axis to the upper leg section at 64 which is co-axial with upper crosstube 58. The pivot axis 64 is above the crossbar 60, and the lower leg section bears against the crossbar 60 to brace the lower leg section when the cart is in its erect condition.

The lower legs 56 have nylon skids 66 on one surface. The nylon skids bear against the upper leg sections 30 when the cart is erect and resting on all four wheels. A pair of springs 67 are fixed to the crosstube 58, by which the legs are pivoted to the upper section, each spring being fixed at one end to the crosstube 58, the other end hooking around the legs 56 to urge them into the erect condition in which the skids bear against the upper leg sections.

The lower leg sections are latchable by elongated latch bars 70 on each side of the one-piece legs. Each latch bar is pivoted at 71 adjacent its upper end to the yoke 24 by which the one-piece legs are pivoted to the frame. The bars have nylon skids 72 fixed to them which are engageable with the rear extremity of a vehicle to cause the latching members automatically to swing to an unlatched position as the cart is thrust into a vehicle. At the lower end of each latching bar 70 is a latch surface 73 which is engageable by a latching bolt 74 fixed to each lower leg 56. Beyond the latch surface 73 is a cam projection 75 which rides along the latching bolt 74. The projection 75 provides a surface 76 along which the latching bolt 74 rides when the lower leg section 31 swings from a position aligned with the one-piece legs 12 to a supporting X-frame position and guides the latching bolt 74 into its latched position against the latching surface 73 of the latching bar (See FIG. 5).

Intermediate the ends of each latching bar is a bolt 78 which projects into a limit stop forming slot 79 in the bracket 28 on the one-piece leg 12. The limit stop 79 at the lower extremity keeps the latching bar from swinging too far downwardly, thereby holding it in a position to be engaged at the cam projection 75 by the bolt 74 on each side of the lower leg section 31. At the upper extremity, the limit stop prevents the latch from jamming up into the connection between the upper and lower leg sections. The latching bars are interconnected by a crossbar 80 so that they move together.

At the upper end portions of the latching bars are extensions 81 which are engageable by the thumbs of the operator as he grasps the frame adjacent the auxiliary wheels to delatch the lower leg section, thereby permitting the four-wheeled cart to be converted to a two-wheeled cart. In that operation, the latch is released by pressing on the extensions 81 of the bars 70 and the lower leg section 31 is thrust in the rearward direction by lifting the forward end of the cart approximately 5° and then swinging lower leg section to a position parallel with the one-piece legs 12, thereby converting the cart to a two-wheeled cart which facilitates its going up and down stairs (See FIG. 5).

A pair of auxiliary handles 83 are pivoted to the frame 16 adjacent the auxiliary wheels 11 and are swingable from an inoperating horizontal position to a vertical position. In the vertical position the operator can support the cart in a horizontal attitude as it is moved up and down stairs without excessive bending over by the operator.

A knob 84 projecting inwardly from one of the latching bars 70 is engageable by the knee of the operator. This is used to delatch the lower leg section 31 when the auxiliary handles 83 are pivoted in their upward position for going up and down steps. In that position, the operator's hands are so removed from the latching bars 70 that he must delatch the cart by engaging the knob with his knee.

OPERATION

There are three principal operations of which the invention is capable, namely, going into and out of a vehicle, changing the level of the cart and negotiating steps and curbs.

Figure 10B:
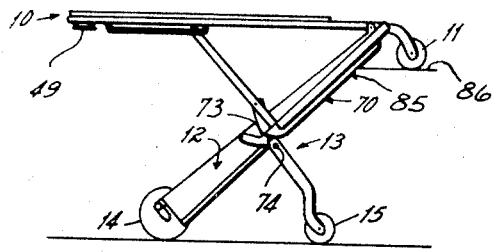
Figure 10E:
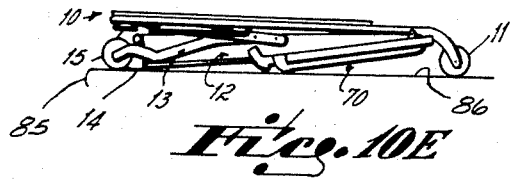

The first operation is illustrated in FIGS. 10A–10E and shows the steps of thrusting the cart into a vehicle. In the first step (FIG. 10A), the cart is rolled up to the rear of a vehicle 85 with its auxiliary wheels 11 resting on the floor 86 of the vehicle, thereby providing support for the forward end of the cart. As the cart is thrust forward, the rear extremity of the vehicle, as for example, the tailgate of a station wagon, engages the latch bars 70 for the lower leg sections thereby freeing the lowr leg sections to swing rearwardly (FIG. 10B). The operator then pulls on the U-shaped actuator 49 beneath his fingers at the rear of the cart frame to swing the level-locating bar 43 out of latching engagement with pin 42 on the crosspiece 34. This freeing of the latched engagement between the bar 43 and the crosspiece 34 permits the crosspiece to slide in a rearward direction so as to permit the collapse of the U-frame 16. Continued thrust by the operator causes the rear extremity of the vehicle to engage the one-piece leg 12 (FIG. 10C) and swing it upwardly until it lies against the bed of the cart. As thrust into the vehicle is continued, the rear extremity of the vehicle engages the skid 66 on the lower leg section 31 (FIG. 10D) and swings it back to a position lying alongside of the one-piece legs, thereby completing the collapse of the cart. In this attitude, it lies on the floor of the vehicle as shown in FIG. 10E.

In removing the cart from the vehicle, the operations are reversed. As the cart is withdrawn from the vehicle, the lower leg sections swing by the force of gravity and the springs 67. Subsequently, the one-piece legs 12 drop down into their fully erect position. As the one-piece legs drop, the latch bar 70 is maintained in an unlatched attitude because it is sliding on the vehicle. During this operation, the swinging of the legs into their X-frame attitude pulls the crosspiece 34 in a forward direction until the pin 42 reaches the notch 52 in the level-locating bar 43. The bar 43, being spring loaded in a latch direction, automatically swings the notch 52 into a position in which it receives the pin 42, thereby holding the legs in an erect attitude. Thus, before the auxiliary wheels leave the floor of the vehicle, the cart becomes fully latched in the X-frame attitude, ready to provide full support for the merchandise on it.

Figure 11A:
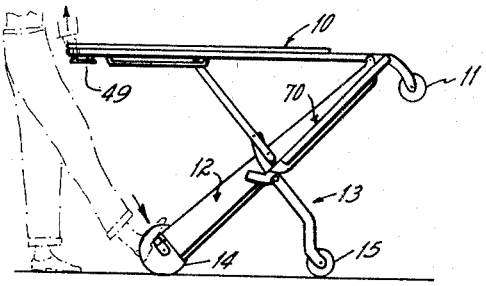
FIGS. 11A and 11B are diagrammatic elevational views illustrating the level changing operation.
Figure 11B:
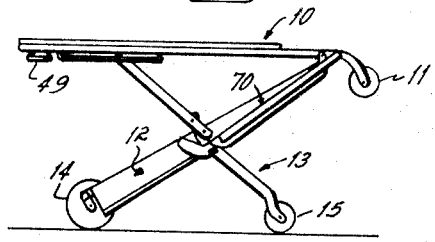
Figure 10C:
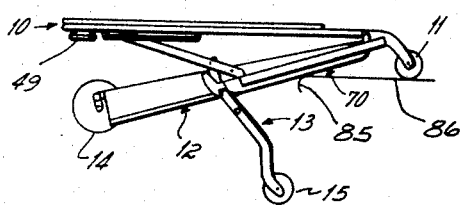
Figure 10D:
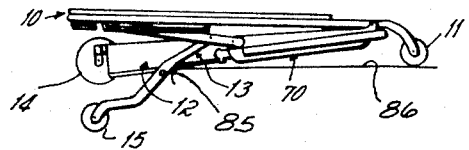

In the second operation, that is, changing the level of the cart, the operator standing at the rear of the cart first braces the cart against complete collapse by putting his foot against the crossmember 25 at the lower end of one-piece legs 12 (FIG. 11A). The operator then swings the actuator 49 with his fingers to bring the level-locating bar 43 out of latching engagement with the crosspiece 34 so as to permit the crosspiece 34 to slide rearwardly. When the latching bar is released, the cart is held in its erect position by the operator gripping the rear end of the cart, as well as bracing the one-piece legs with his foot. A slight relaxation by the operator permits the crosspiece to slide rearwardly until an appropriate notch 53 in the latching bar receives the pin, thereby latching the cart in a new level (FIG. 11B).

The level can be reversed simply by the operator gripping the rear end of the cart and pushing his foot against the crossbar at the lower ends of the one-piece legs to change the position of the X-frame. The pin on the crosspiece will automatically ride out of its notch and seek the notch at the forward end of the latching bar to lock the cart in its elevated position.

Figure 12A:
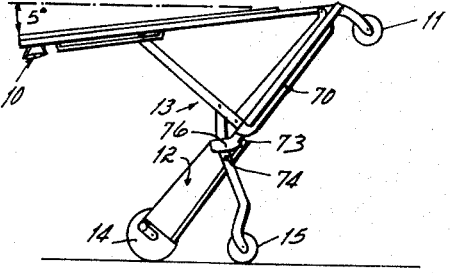
FIGS. 12A and 12B are diagrammatic side elevational views illustrating the step-negotiating operation.
Figure 12B:
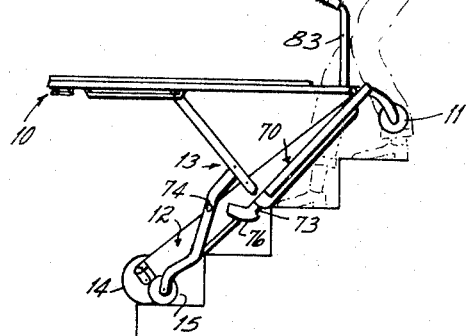

The third operation involves negotiating steps. Here the objective is to convert the four-wheeled cart to a two-wheeled cart with the cart being supported only on the one-piece legs and with the operator standing at the forward end of the cart. Fundamental to the operation is the rearward swinging of the lower leg section. This is accomplished by upward pivoting of the latching bars 70 associated with the lower leg section 31, and lifting the forward end of the cart a few degrees to permit the lower leg section 31 to swing into approximate alingment with the one-piece legs 12 (FIG. 12B). The release of the latch can be effected by application of pressure by the thumbs of the operator on the upper extensions 81 of the latch bars 70 or by engaging the knob 84 projecting inwardly from one of the latch bars with the operator's knee. The former operation is used in going over curbs or up and down very gradually sloped steps. Where steeper steps are encountered, the auxiliary handles 83 are pivoted to the upper position, gripped by the operator and engagement of it is released by the operator's knee. It can be observed by reference to FIG. 1 that the space between auxiliary wheels 11 and hence auxiliary handles 83 is free from any obstruction such as a crossbar, thereby enabling the operator to stand as close as possible to the center of gravity of the load and to avoid bending over. As the cart moves up or down steps, the cart is, in part, slid along the skids 27 which extend approximately tangentially to the rearward wheels 14 of the cart and in part, by the wheels rolling over the edges of the steps. When the stair-negotiating operation is completed, the forward end of the cart is once again lifted slightly to enable the springs 67 on the lower leg sections to swing the lower leg sections over center toward the front of the cart. During this operation the latching bolt 74 engages the cam surface 75 to urge the latch 70 upwardly so that the bolt will be positioned to engage the latch surface 73. Returning the weight of the cart to the wheels forces the lower leg sections into their fully supportive position and the latch surface 73 is engaged by the latch bolt 74 to lock the lower leg sections in position.

We claim:

1. A cart comprising,
   means forming a generally horizontal bed,
   diagonal forward and rearward pairs of legs secured to said bed and pivoted together on a first axis at their mid-sections to provide an X-frame support for said cart, said X-frame providing the sole ground support for said cart,
   the forward pair of legs being formed in upper and lower leg sections pivoted to each other on a second axis above said first axis,
   means bracing said lower section generally in alignment with said upper section, and
   said lower section being adapted to swing rearwardly into approximate alignment with said rearward legs.

2. A cart as in claim 1 further comprising auxiliary wheels mounted at the forward end of said bed to permit said cart to be rolled into a vehicle.

3. A cart as in claim 1 in which said bracing means comprises.
   a transverse member on the lower ends of said upper leg section,
   means pivoting said upper ends of said lower leg section to said upper leg section at an axis above said transverse member.
   said lower leg section being braced by said pivoting mean and engagement of said lower leg section with said transverse member.

4. A cart as in claim 1 further comprising,
   wheels on the forward and rearward legs of said cart,
   skids on said rearward legs extending from a location adjacent the rim of said wheels a substantial distance along said rearward legs, thereby providing a surface which facilitates moving said cart up and down stairs.

5. A cart as in claim 1 further comprising,
   means slidably mounting the upper ends of one pair of said legs on said bed,
   releasable means normally bracing said upper ends of said legs toward the central portion of said cart to hold said cart in an erect condition, said upper ends bracing means when released permitting said X-frame to collapse until said legs lie generally flat along said bed.

6. A cart as in claim 5 in which said bracing means comprises,
   a transverse cross-piece slidably mounted on said bed,
   the upper ends of said one pair of legs being pivotally mounted on the ends of said cross-piece,
   a longitudinally extending level locating bar movably mounted on said bed for cooperation with said cross-piece,
   and cooperating latching surfaces on said cross-piece and bar respectively to normally brace said cross-piece against sliding movement and to permit sliding movement when said bar is moved to disengage said latching surfaces.

7. A cart as in claim 6,
   and a spring connected between said bed and said bar normally urging said bar in a latching position.

8. A cart as in claim 1 further comprising,
   releasable means for locking said lower leg section in braced condition,
   said locking means adapted to be actuated by an operator standing at either end of said cart.

9. A cart as in claim 8 in which said releasable means comprises,
   at least one latching bar pivotally mounted adjacent the upper end of a rearward leg and extending downwardly along said leg,
   cooperating latching surfaces on said bar and leg section, respectively.

10. A cart as in claim 9, said bar having a projection extending above its pivot point for contact and pivoting to a release position by an operator standing at the forward end of said cart.

11. A cart as in claim 9, said bar being engageable by the extremity of a vehicle to pivot it to a release position when the cart is thrust by an operator standing at the rearward end of the cart, toward a vehicle.

12. A cart comprising,
    means forming a generally horizontal bed,
    auxiliary wheels mounted on the forward end of said bed,
    diagonal forward and rearward pairs of legs secured to said bed and pivoted together on a first axis at their mid-sections to provide an X-frame support for said cart, said X-frame providing the sole ground support for said cart,
    wheels at the lower ends of said legs,
    the forward pair of legs being formed in upper and lower leg sections pivoted to each other on a second axis above said first axis,
    means bracing said lower section generally in alignment with said upper section,
    said lower section being adapted to swing rearwardly into approximate alignment with said rearward legs,
    means slidably mounting the upper ends of said upper section on said bed,
    releasable means normally bracing the upper ends of said leg sections toward the central portion of said card to hold said cart in an erected condition, said releasable means when released, permitting said X-frame to collapse until said legs lie generally flat along said bed.

13. A cart as in claim 12 in which the wheels on said forward legs are mounted as casters.

14. A cart as in claim 12 in which,
said bed comprises a frame having free ends at at least one end of said cart, said auxiliary wheels being mounted on said free ends of said frame,
a tabletop overlying and secured to said frame,
said tabletop leaving exposed frame portions at both ends of said cart to provide hand grips for an operator of said cart.

15. A cart comprising,
a generally rectangular frame,
four wheeled legs depending from said frame,
two spaced extensions projecting from the forward end of said frame,
auxiliary wheels on said extensions,
said extensions forming hand grips,
means for collapsing only the forward legs by an operator standing at the forward end of said frame and supporting the forward end by grasping said extensions, and
elongated auxiliary handles pivotally mounted on said extensions for movement between horizontal and vertical position,
said handles in said vertical positions permitting an operator to support said cart, as it travels on stairs, by grasping the free ends of said auxiliary handles.

* * * * *

UNITED STATES PATENT OFFICE
CERTIFICATE OF CORRECTION

Patent No. 3,752,527          Dated August 14, 1973

Inventor(s) Richard H. Ferneau & Elroy E. Bourgraf

It is certified that error appears in the above-identified patent and that said Letters Patent are hereby corrected as shown below:

Title of the patent should be changed from A MULTI-LEVER ONE-MAN CART ADAPTED TO BE MOVED UP AND DOWN STAIRS to

A MULTI-LEVEL ONE-MAN CART ADAPTED TO BE MOVED UP AND DOWN STAIRS

Col. 2, line 51, after maintain, "cottrol" should be -- control --

Col. 5, line 59, "lowr" should be -- lower --

Signed and sealed this 18th day of December 1973.

(SEAL)
Attest:

EDWARD M. FLETCHER, JR.       RENE D. TEGTMEYER
Attesting Officer            Acting Commissioner of Patents